United States Patent
Zhang et al.

(10) Patent No.: US 9,312,557 B2
(45) Date of Patent: Apr. 12, 2016

(54) FUEL CELL APPARATUS AND METHOD FOR DOWNHOLE POWER SYSTEMS

(75) Inventors: Wenlin Zhang, Ridgefield, CT (US); Terizhandur S. Ramakrishnan, Bethel, CT (US); Joseph Walter, Sugar Land, TX (US); Albert Perez, Jr., Danbury, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 1227 days.

(21) Appl. No.: 11/126,524

(22) Filed: May 11, 2005

(65) Prior Publication Data

US 2006/0257697 A1    Nov. 16, 2006

(51) Int. Cl.
| | |
|---|---|
| *H01M 8/10* | (2006.01) |
| *E21B 49/08* | (2006.01) |
| *H01M 8/24* | (2006.01) |
| *E21B 41/00* | (2006.01) |
| *H01M 8/04* | (2006.01) |
| *H01M 8/18* | (2006.01) |

(52) U.S. Cl.
CPC ........... *H01M 8/241* (2013.01); *E21B 41/0085* (2013.01); *H01M 8/0488* (2013.01); *H01M 8/04089* (2013.01); *H01M 8/0491* (2013.01); *H01M 8/04104* (2013.01); *H01M 8/04365* (2013.01); *H01M 8/04388* (2013.01); *H01M 8/04395* (2013.01); *H01M 8/04559* (2013.01); *H01M 8/04589* (2013.01); *H01M 8/04753* (2013.01); *H01M 8/186* (2013.01); *Y02E 60/528* (2013.01); *Y02P 70/56* (2015.11)

(58) Field of Classification Search
None
See application file for complete search history.

(56) References Cited

U.S. PATENT DOCUMENTS

| | | | |
|---|---|---|---|
| 5,202,194 A | 4/1993 | VanBerg, Jr. | |
| 5,712,054 A | 1/1998 | Kejha | ............................. 429/21 |
| 5,732,776 A * | 3/1998 | Tubel et al. | ............. 166/250.15 |
| 5,839,508 A * | 11/1998 | Tubel et al. | .................. 166/65.1 |

(Continued)

FOREIGN PATENT DOCUMENTS

GB    2009473 A    6/1979

OTHER PUBLICATIONS

Burke, K.A. "Unitized Regenerative Fuel Cell System Development." 1st International Energy Conversion Engineering Conference sponsored by American Institute of Aeronautics and Astronautics, Portsmouth, Virginia, Aug. 17-21, 2003, NASA, NASA/TM-2003-212739 (Dec. 2003).

(Continued)

*Primary Examiner* — Cynthia K Walls
(74) *Attorney, Agent, or Firm* — Jakub Michna (57) ABSTRACT

A rechargeable power system comprising: a drill string configured to operate in a well bore, the drill string comprising: a fuel cell system; a generator in electrical communication with the fuel cell system; a turbine, configured to rotate due to an impingement of drilling mud on one or more turbine blades, the turbine in operable communication with the generator; and where the fuel cell system is configured to provide power at least when drilling mud is not circulating in the well bore, and further configured to be recharged by the generator when drilling mud is circulating in the well bore. A method for operating a rechargeable downhole fuel cell. The method comprises: monitoring a fluid supply pressure; determining whether the fluid supply pressure is below a threshold value; and stopping a fuel cell discharge if the fluid supply pressure is below the threshold value.

10 Claims, 9 Drawing Sheets

(56) References Cited

U.S. PATENT DOCUMENTS

| | | | |
|---|---|---|---|
| 6,093,500 A * | 7/2000 | Margiott et al. | 429/13 |
| 6,596,427 B1 * | 7/2003 | Wozniczka et al. | 429/32 |
| 6,686,079 B2 | 2/2004 | Zhang et al. | 429/25 |
| 7,219,722 B2 * | 5/2007 | Fincher et al. | 166/65.1 |
| 7,224,080 B2 | 5/2007 | Smedstad | |
| 2002/0058175 A1 * | 5/2002 | Ruhl | 429/32 |
| 2003/0157397 A1 * | 8/2003 | Barton et al. | 429/44 |
| 2004/0011668 A1 * | 1/2004 | Shiepe et al. | 205/742 |
| 2004/0081865 A1 | 4/2004 | Zhang et al. | |
| 2009/0126928 A1 * | 5/2009 | Sumrall et al. | 166/250.01 |

OTHER PUBLICATIONS

Burke et al. "Unitized Regenerative Fuel Cell System Gas Dryer/Humidifier Analytical Model Development." $2^{nd}$ International Energy Conversion Engineering Conference sponsored by American Institute of Aeronautics and Astronautics, Providence, Rhode Island, Aug. 16-19, 2004, NASA, NASA/TM-2004-213355, AIAA-2004-5700 (Oct. 2004).

Appleby, A. J. and F.R. Foulkes, *Fuel Cell Handbook*. 1989. Malabar: Krieger Publishing Company, 1993: p. 394.

\* cited by examiner

FUEL CELL APPARATUS AND METHOD FOR DOWNHOLE POWER SYSTEMS

TECHNICAL FIELD

The disclosed apparatus relates to fuel cells, and particularly to fuel cells that are especially well suited for downhole use in oil and gas wells, and for subsea use in connection with offshore wells. More particularly, the disclosed apparatus may be used in logging while drilling applications.

BACKGROUND

Several types of equipment are used downhole in oil and gas wells, or beneath the surface of the sea adjacent to offshore wells. These types of equipment may be electrically operated or actuated. Examples of such equipment include certain wireline tools and remote well telemetry equipment. The electrical power required can be provided by connecting the device to a surface power source via electrical cables, or by placing a power source near the site of the device itself. Often it is not practical to use electrical cables running from the surface to the subterranean or subsea site of the electrically-powered device, because of the great distance involved, or because the cables can interfere with the passage of other equipment through the wellbore, and may be vulnerable to being damaged during well operations. In particular, during logging while drilling, where the drill pipe rotates, a cable can not typically be run either for telemetry or for power.

Applications in logging while drilling or measurement while drilling (collectively known as LWD) often require power. Typically power in LWD applications is supplied by a turbine through which drilling mud is circulated. Power output of about 200 W is common from the turbine. However, when drilling mud is not being circulated, auxiliary power may be required. Auxiliary power may be provided by a high temperature lithium thionyl chloride battery, for example. In small configurations, these batteries may achieve an energy density of 500 Whl$^{-1}$. While these batteries have a nominal temperature limit of 150° C., ratings as high as 200° C. may be accomplished through specific design. However, using these batteries presents another host of obstacles. For instance, these batteries tend to be expensive, and because of the inherently reactive nature of thionyl chloride, transportation and disposal restrictions apply. Costs are often increased because downhole operational procedures may require that these batteries be disposed of even after partial use, because every LWD job may require a fresh power pack. In addition, increasing the power and energy generation capacity of a battery generally requires a proportionate increase in the size of the battery, which can present difficulties given the limited space constraints that exist in wellbores. These batteries are not rechargeable, thereby requiring batteries with sufficient energy capacity to last the duration of a logging operation.

Fuel cells may be used as a local source of power for downhole and subsea electrical devices. Fuel cells make use of an electrochemical reaction involving a fuel and an oxidant in a cell that comprises an anode, cathode, catalyst, gas distribution layers and electrolyte, to generate electricity without generating the unwanted by-products associated with combustion, while providing relatively higher energy efficiency. Fuel cells potentially have a number of advantages over other power generation or storage means in many applications. In a fuel cell, water is electrochemically synthesized from its elemental constituents, hydrogen and oxygen. The useful part of the heat of formation for this reaction, $\Delta H_f$, is the Gibbs free energy, $\Delta G_f$. In a fuel cell, the Gibbs free energy is converted to electrical work and heat.

A number of obstacles have hindered the use of fuel cells in downhole and subsea applications. For example, in a continuous operation, a steady supply of the reactant gases, and removal of the produced water is necessary, not easily achieved in oilfield downhole applications. Continuous operation is also restricted by the amount of gases carried in the containers and the associated weight constraints. Furthermore, water disposal requires pumping to a borehole at high pressure, which creates its own difficulty. Fuel cells typically include one or more pumps to provide circulation of fuel and/or oxidant in a closed loop through the cell. If such a pump fails downhole, repair or replacement can be extremely expensive, given the need to retrieve the fuel cell to the surface. Further, the operation of the pumps consumes some of the energy produced by the cell, thus reducing the net power yield available to operate an external device. This latter point can be a significant problem in downhole or subsea applications in which a supply of power is needed for certain period of time, and yet space constraints limit the ability to simply increase the size of the fuel and oxidant reservoirs. Additionally, the reaction product, such as liquid water or water vapor, needs to be removed from the fuel cell stack in order to continuously run the fuel cell. Removal of the water in a downhole presents a challenge because the surrounding pressure is higher than that present in a conventional fuel cell placed at surface in an ambient environment and operating in air. Using a pump to expel the water into the high pressure downhole or may require a large amount of power making such a system impractical.

There is a need for a new power supply apparatus that can provide the electrical power needed to operate various downhole equipment. Such a power supply needs to be compact and rugged for a downhole environment. Additionally such a power supply apparatus needs to be able to supply power when drilling mud is not being circulated in an LWD environment.

SUMMARY

The disclosed apparatus relates to a rechargeable power system comprising: a drill string configured to operate in a well bore, the drill string comprising: a fuel cell system; a generator in electrical communication with the fuel cell system; a turbine, configured to rotate due to an impingement of drilling mud on one or more turbine blades, the turbine in operable communication with the generator; and where the fuel cell system is configured to provide power at least when drilling mud is not circulating in the well bore, and further configured to be recharged by the generator when drilling mud is circulating in the well bore.

The disclosed apparatus also relates to a rechargeable fuel cell configured to operate in a well bore. The fuel cell comprises: a fuel cell stack; a power conditioner in electrical communication with the fuel cell stack; a system controller in electrical communication with the power conditioner, and the fuel cell stack; and where the fuel cell is configured to provide power at least when drilling mud is not circulating in the well bore, and further configured to be recharged by a generator when drilling mud is circulating in the well bore.

The disclosed method relates to operating a rechargeable downhole fuel cell. The method comprises: monitoring a fluid supply pressure; determining whether the fluid supply pressure is below a threshold value; and stopping a fuel cell discharge if the fluid supply pressure is below the threshold value.

Another embodiment of the method relates to operating a rechargeable downhole fuel cell. The method comprises: monitoring a fluid supply pressure; determining whether the fluid supply pressure is above a threshold value; and stopping a fuel cell recharge if the fluid supply pressure is above the threshold value.

An additional embodiment of the method relates to operating a rechargeable downhole fuel cell. The method comprises: monitoring a voltage at a fuel cell stack; determining whether the voltage is below a first voltage threshold for a given current; and stopping a fuel cell discharge if the voltage is below the first voltage threshold.

A further embodiment of the method relates to operating a rechargeable downhole fuel cell. The method comprises: monitoring a supply voltage at a fuel cell stack; determining whether the voltage is above a second voltage threshold for a given charging current; and stopping a fuel cell recharge if the voltage is above the second voltage threshold for a given charging current.

In still another embodiment, the method relates to operating a rechargeable downhole fuel cell. The method comprises: monitoring a discharge current at a fuel cell stack; determining whether the discharge current is below a discharge current threshold for a fixed voltage; and stopping a fuel cell discharge if the current is below the current threshold for a fixed voltage.

Additionally, a further embodiment relates to a method for operating a rechargeable downhole fuel cell. The method comprises: monitoring a current at a fuel cell stack; determining whether the current is below a current threshold for a fixed voltage; and stopping a fuel cell recharge if the current is below the current threshold for a fixed voltage.

A related embodiment relates to a method for operating a rechargeable downhole fuel cell. The method comprises: monitoring a current at a fuel cell stack; monitoring a voltage at a fuel cell stack; determining whether the current is above a current threshold for a for a fixed power output; stopping a fuel cell discharge if the current is above the current threshold for a fixed power output; determining whether the voltage is below a voltage threshold for a fixed power output; and stopping a fuel cell discharge if the voltage is below the voltage threshold for a fixed power output.

In still another embodiment, the method relates to operating a rechargeable downhole fuel cell. The method comprises: monitoring a current at a fuel cell stack; monitoring a voltage at a fuel cell stack; determining whether the current is below a current threshold for a fixed recharge power; stopping a fuel cell recharge if the current is below the current threshold for a fixed recharge power; determining whether the voltage is above a voltage threshold for a fixed recharge power; and stopping a fuel cell recharge if the voltage is above the voltage threshold for a fixed recharge power.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
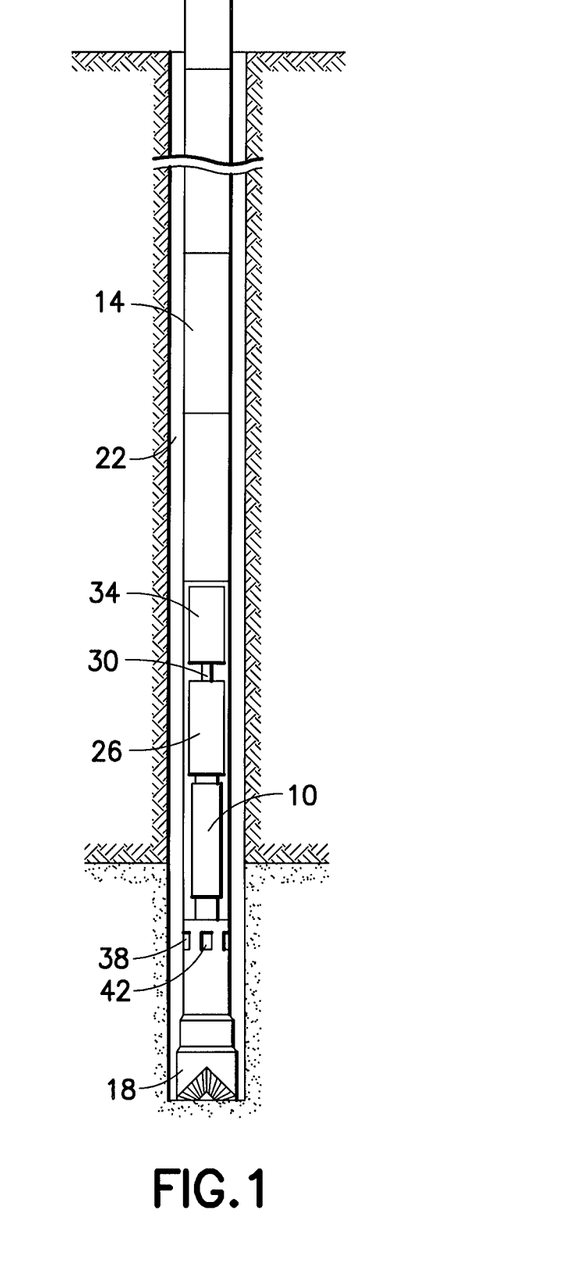
FIG. 1 is a schematic cross-sectional view of a downhole drill string with the disclosed fuel cell system.

Turning to FIG. 1, a new and improved fuel cell system 10 is depicted in a typical drill string 14. Although the disclosed fuel cell system 10 is primarily described herein in relation to applications involving subterranean wellbores, it should be understood that the disclosed system 10 can be used in applications other than wellbore applications. The drill string 14 comprises a rotary drill bit 18 adapted for excavating a borehole 22 through various earth formations. As the drill string 14 is rotated by a typical drilling rig (not shown) at the surface, substantial volumes of a suitable drilling fluid or so-called "drilling mud" are continuously pumped downwardly through the tubular drill string and discharged from the drill bit 18 to cool the bit as well as to carry cuttings removed by the bit 18 to the surface as the drilling mud is returned upwardly along the borehole 22 exterior of the drill string. Electrical power may be provided during drilling by a rotary drive generator 26 that is coupled, as by a shaft 30, to an otherwise-typical turbine 34. During drilling, drilling mud impinges against the blades of the turbine 34, which in turn drives the generator 26 thereby producing electricity. The fuel cell system 10 is in electrical communication with the generator 26. The fuel cell system 10 is coupled to one or more condition-responsive transducers 38 or downhole tools 42. It will, of course, be appreciated that these condition-responsive transducers 38 will be adapted as required for measuring such downhole conditions as the pressure, the temperature, the resistivity or conductivity, acoustic and nuclear responses of either the drilling mud or adjacent earth formations as well as various other formation conditions or characteristics which are typically obtained by present-day wireline logging tools. It will also be appreciated that the downhole tools 42 may include, but not be limited to: actuators, motors, pumps, compressors and other drive systems.

Figure 2:
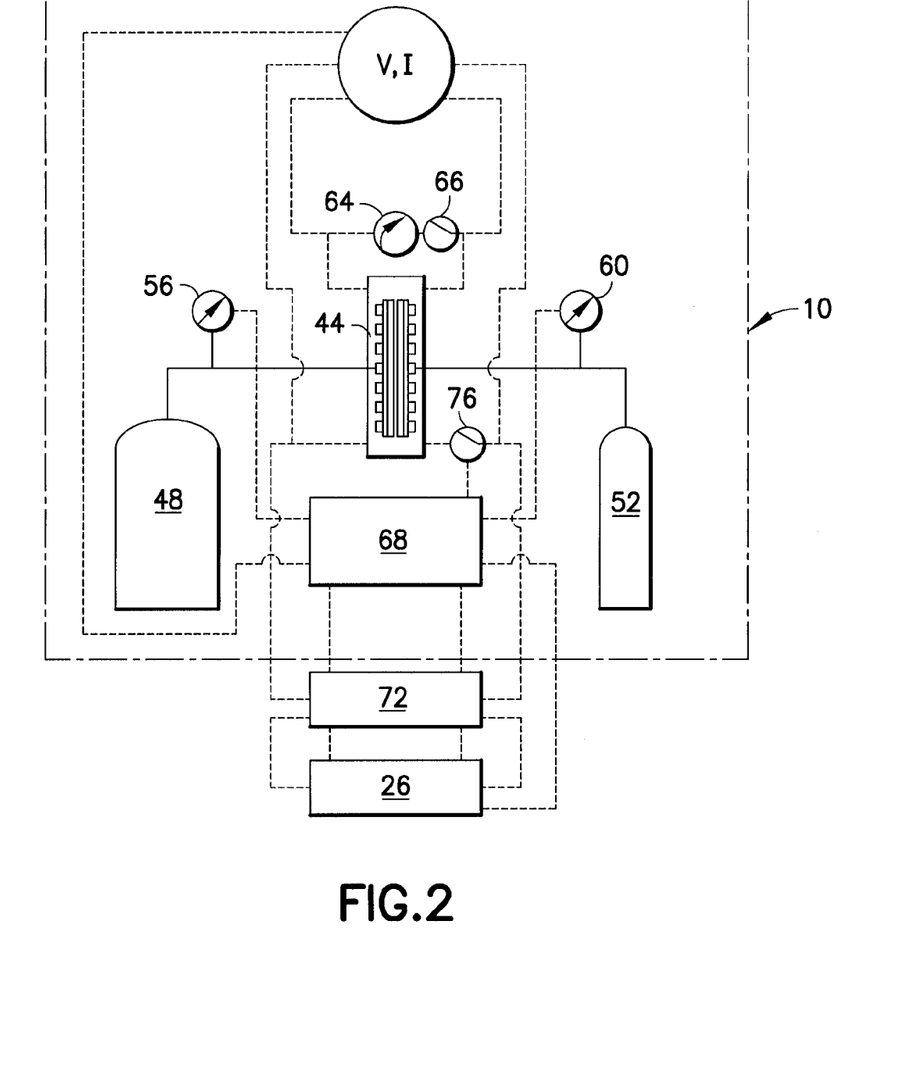
FIG. 2 is a schematic of the fuel cell system from FIG. 1.

FIG. 2 shows a detailed schematic view of the fuel cell system 10. A fuel cell stack 44 is in fluid communication with a hydrogen supply 48 and an oxygen supply 52. The hydrogen and oxygen supplies 48, 52 may be pressurized containers of the respective fluids. A first pressure measuring device 56 is in fluid communication with the hydrogen supply 48, and a second pressure measuring device 60 is in fluid communication with the oxygen supply 52. In electrical communication with the fuel stack 44, is an electrical load 64. Electrical communication in FIG. 2 is represented by the dashed lines. An electrical switch 66 is located between the load 64 and the fuel cell stack 44. The generator 26 is in electrical communication with a power conditioner 72. The power conditioner 72 is in electrical communication with the fuel cell stack 44. An electrical switch 76 is located between the fuel cell stack 44 and the power conditioner 72. A system controller 68 is in electrical communication with the first and second pressure measuring devices 56,60, the switches 66, 76, the power conditioner 72, and the generator 26. A voltage or current measuring device 80 is coupled to the electrical load 64, the fuel cell stack 44, and the system controller 68.

Still referring to FIG. 2, the hydrogen supply 48 and oxygen supply 52 may be configured to be about nearly at the same pressure. One of ordinary skill in the art will recognize that at the same pressure, the hydrogen volume required is roughly twice that of oxygen. The fuel cell system may comprise a proton exchange membrane (PEM). Hydrogen is the fuel, and oxygen is the oxidizer. Water is formed as a result of the synthesis between hydrogen and oxygen. In a preferred embodiment, pure oxygen may be provided by the oxygen supply 52 in order to conserve space. In the disclosed fuel cell system, the produced water is kept within the fuel cell stack 44 in a water storage medium, which will be described further in FIG. 3. The catalysts may be standard platinum loadings on both hydrogen and oxygen sides for fuel cell discharge (water synthesis). However, $IrO_x$ and/or $RuO_2$ may be added on oxygen side as the catalyst for water electrolysis during charge steps. Therefore, the catalyst on the oxygen side may be a mixture of Pt, $IrO_x$ and/or $RuO_x$ with dual functions.

A. J. Appleby and F. R. Foulkes discuss in their book, *Fuel Cell Handbook*, Krieger Pub Co., at page 394, the following, which is incorporated herein:

"In addition to the work done with these material in alkaline solutions, some investigations also have been made of their utility for acid systems. For example, the U.S. National Bureau of Standards carried out a number of potentiodynamic and galvanostatic studies on some of the more promising mixed oxides to determine if they could be used as oxygen reduction electrocatalysts in phosphoric acid fuel cells. The results showed that barium ruthenate and the systems Ti—Ta—O, V—Nb—O, and Ce—Ta—O were stable in hot phosphoric acid at temperatures up to about 150° C. Soviet workers have investigated a number of simple and complex oxides of cobalt and/or nickel for oxygen reduction in acid media, as well as the effects of adsorbed oxygen on the reduction rate, and have reported that the electrodes containing cobalt possessed the highest activity."

"Several authors have reported methods of preparing spinel and metal oxideelectrocatalysts and electrodes. Japanese workers have described the preparation of sintered spinel-type electrodes using $Cu_xFe_{x-x}O_4$ or $Zn_xFe_{3-x}O_4$ (x=0.005~0.4) with resistivities of about 0.044 Ωcm. Methods also have been reported for the preparation of oxygen cathodes on metallic screens with compressed mixtures of 85~95% metal oxide and 5~15% of conducting powdered material such as silver, nickel, cobalt, or acetylene black, plus a binder. Westinghouse Electric Corporation has patented an air electrode formulation that makes use of $CuWO_4$, $NiWO_4$ and or $CoWO_4$, in addition to other materials, as oxygen reduction catalysts. The effects of catalyst preparation parameters on the performance of simple and complex oxide oxygen reduction electrocatalysts have also been investigated, and the preparation of oxygen reduction catalysts of the mixed oxide type for use in alkaline solutions has been reviewed."

"As in the case of the perovskite oxides, the spinels and other mixed oxide catalysts have also been used as oxygen evolution catalysts. Those which have been used in alkaline solutions for this purpose include $NiCo_2O_4$, $Co_3O_4$, transition metal oxides in general, and mixed nickel-lanthanide group metal oxides. Those used in acid solutions (usually sulfuric acid) have included transition metal oxides, mixtures of tin, antimony, and manganese oxides, and mixed oxides of ruthenium (especially Ru—Lr—Ta)."

Figure 3:
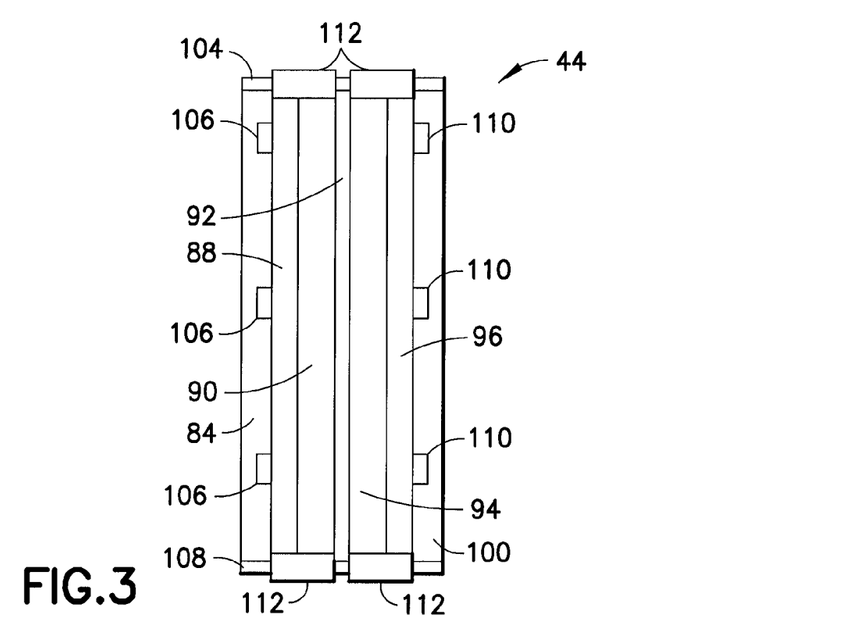
FIG. 3 is a schematic cross-sectional view of the fuel cell stack from FIG. 2.

FIG. 3 shows a detailed view of the fuel cell stack 44. In this view only one stack is shown, however, two or more fuel cell stacks 44 may be coupled in series in order to provide more power. A first bipolar plate 84 is adjacent to a first gas distribution and water storage region 88. Adjacent to the first gas distribution and water storage region 88 is a first carbon matrix plus catalyst region 90 (carbon matrix is the gas distribution layer). Adjacent to the first carbon catalyst region 90 is a PEM 92. Adjacent to the PEM 92 is a second carbon matrix plus catalyst region 94. Adjacent to the second carbon matrix plus catalyst region 94 is a second gas distribution and water storage region 96. Adjacent to the second gas distribution and water storage region 96 is a second bipolar plate 100. A hydrogen line 104, in communication with the hydrogen supply 48, provides hydrogen to the fuel cell stack 44. The hydrogen is distributed to the to the first catalyst region 90 via hydrogen channels 106 in the first bipolar plate 84. An oxygen line 108, in communication with the oxygen supply 52, provides oxygen to the fuel cell stack 44. The oxygen is distributed to the second catalyst region 94 via oxygen channels 110 in the first bipolar plate 84. Seals 112 are located about the fuel cell 44 stack to prevent hydrogen and/or oxygen from leaking out of the fuel cell stack 44.

During LWD applications power is available except when the drilling mud circulation is stopped, precisely when some stationary measurement such as pressure or temperature is desired. The disclosed fuel cell system 10 is a compact unit with dual functionality and is configurable to operate as (1) a fuel cell which generates electricity during times when drilling mud circulation is stopped, and as (2) an electrolyzer during drilling mud circulation periods. During the recharging stage, the fuel cell system acts as an electrolyzer and dissociates water back into hydrogen and oxygen. Thus, the fuel cell system 10 needs only a small amount of hydrogen and oxygen, enough to meet the energy requirements between recharges. The recharging is expected to compensate for both the energy consumed, the inherent inefficiency and the self-discharge that may occur.

A PEM fuel cell is a preferred embodiment of the disclosed fuel cell system. However, the disclosed fuel cell system may comprise other types of fuel cells, including but not limited to: Solid Oxide Fuel Cells (SOFC), Phosphoric Acid Fuel Cells (PAFC), and Alkaline Fuel Cells (AFC). Water is formed in the fuel cell stack as a result of the synthesis between hydrogen and oxygen. In a preferred embodiment, pure oxygen is utilized as the oxidant in order to conserve space. This is by no means necessary, and the oxygen may be mixed with any diluent if safety or oxidation becomes a concern. The use of a diluent in a stagnant fuel cell, however, leads to progressive degradation of generated power as the oxygen is consumed and the diluent accumulates at the gas distribution layer. It is for this reason that in a disclosed embodiment pure oxygen is used.

The water produced during operation of the fuel cell is kept within the fuel cell stack 44 via the first and second gas distribution and water storage regions 88,96. In one embodiment, the regions 88, 96 comprise wettable porous carbon paper or in another embodiment the regions 88, 96 may comprise a tightly woven porous carbon cloth. Porous carbon is a good choice because it is both conductive, inert at the operating conditions, and capable of storing water. The hydrogen supply 48 and the oxygen supply 52 only need to provide a relatively small amount of hydrogen and oxygen to the fuel cell stack 44. The fuel cell system only requires enough hydrogen and oxygen to operate the fuel cell system during those times when the drilling mud circulation has stopped. Thus, the stored energy in the hydrogen supply 48 and oxygen supply 52 is limited, but the power capacity is sufficient due to the ability of the disclosed fuel cell system to be recharged when the drilling mud is circulating.

The power required for recharging comes from the generator 26. The fuel cell stack 44 is configurable to electrolyze water, thus generating hydrogen and oxygen. This is enabled by having dual catalysts impregnated in the first carbon matrix plus catalyst region 90 and the second carbon matrix plus catalyst region 94 where the electrolysis will occur. Thus, the fuel cell stack 44 doubles as both a fuel cell and an electrolyzer. The small amount of water generated during the fuel cell cycle of the fuel cell stack 44 is converted back to the original constituents during the electrolysis stage, essentially removing any need to pump the water out of the system. The quantity of water is sufficiently small that it can be held in the pore space of the carbon paper or cloth located in the first gas distribution and water storage region 88 and the second gas distribution and water storage region 96. The added benefit of a carbon paper or cloth system is that it is robust with respect to tool orientation. In other words, the capillary retention within a thin conductive hydrophilic paper or cloth is significantly stronger than any gravity induced flow. The retention of water within the system and the ability to electrolyze also takes care of some of the expected leak within the system from the hydrogen side to the second bipolar plate 100 (the oxygen electrode). A synthesis of water occurs; but while the energy is lost, the hydrogen and oxygen will be regenerated at a later point. However, if the hydrogen leaks out of the fuel cell chamber, a loss of energy capacity occurs. A proper sealing system, comprising seals 112, to prevent such leakage is important.

Figure 4:
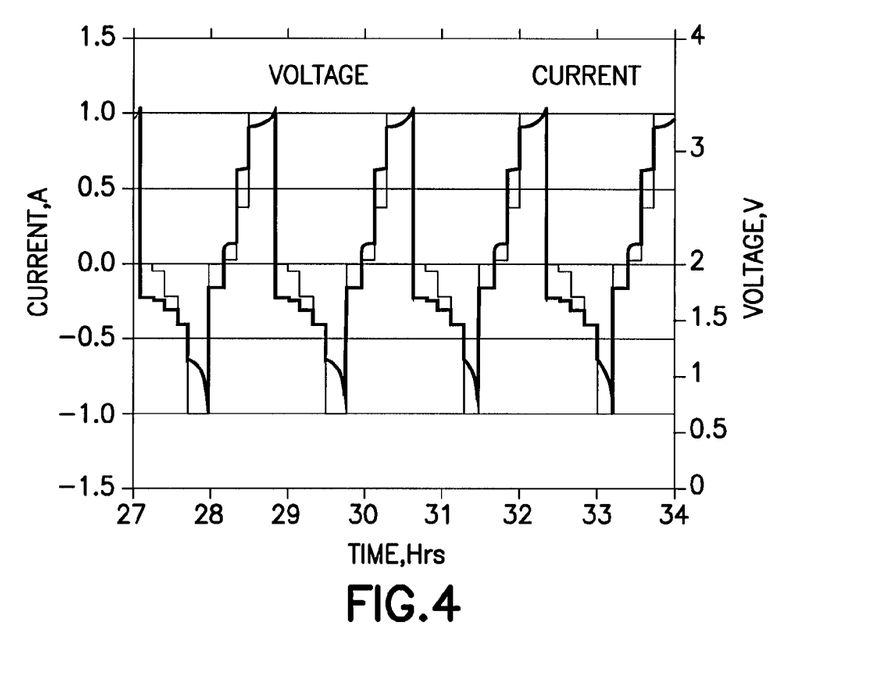
FIG. 4 is a graph of current and voltage versus time for a disclosed fuel cell stack.

Upon synthesis of water via the fuel cell stack 44, both the hydrogen supply 48 and the oxygen supply 52 chambers will be depleted. The resulting pressure reduction may be monitored by the system controller 68 via the first pressure measuring device 56 and the second pressure-measuring device 60. Upon a certain magnitude of pressure loss, the system controller 68 may start a fuel cell recharge procedure. The recharge procedure may also be started according to the voltage and current vs. time characteristics of the fuel cell 10, as shown in FIG. 4. At a fixed current discharge, a precipitous drop in voltage signals the need for recharge.

The water produced by the fuel cell reaction is mainly accumulated in the hydrophilic carbon paper or a carbon cloth located within the second gas distribution and water storage region 96, adjacent to the cathode (second bipolar plate 100) where pure oxygen meets the protons diffusing through the PEM and the electrons flowing through the external circuit. The reaction at the anode (first bipolar plate 84) is:

$$H_2 \leftrightarrows 2H^+ + 2e^-  \quad\quad \text{Equation 1}$$

The reaction at the cathode is:

$$\tfrac{1}{2}O_2 + 2e^- + 2H^+ \leftrightarrows H_2O  \quad\quad \text{Equation 2}$$

For the latter, the direction of the reaction is determined by the presence (reverse reaction) or absence (synthesis of water) of a sufficient applied voltage. When the forward (going to the right) reaction occurs, a voltage is developed by the fuel cell, the magnitude of which depends upon the drawn current. The zero current voltage is also termed the open circuit voltage (OCV) and is dependent upon the exact operating environment conditions such as, the fugacities of the reactants and the temperature. Many of these conditions are fixed by the design of the gas supply system that comprises the fuel cell 10. The produced water is held within the fuel cell stack 44 so that it is available in the reverse process of electrolysis. For the reverse reaction (going to the left), water is electrolyzed back into hydrogen and oxygen when a voltage is applied across the reverse reaction anode (second bipolar plate 100) and the reverse reaction cathode (first bipolar plate 84). Note that during the forward reaction, when the fuel cell system is producing electricity, the first bipolar plate 84 is the anode and the second bipolar plate 100 is the cathode, and conversely, during the reverse reaction, where the water is electrolyzed back into hydrogen and oxygen, the first bipolar plate 84 is now the cathode, and the second bipolar plate 100 is now the anode. Due to various losses when a finite current is drawn from the fuel cell cycle, the generated voltage will be between about half and the full value of the open circuit voltage. Conversely, during the electrolyzer cycle, the applied voltage would be roughly between about one to about two times that of the open circuit voltage. The first gas distribution and water storage region 88 and the second gas distribution and water storage region 96 must permit reimbibition of water into the PEM 92. In the recharge cycle, the accumulated water is electrolyzed to form hydrogen and oxygen. Both oxygen and hydrogen are synthesized under pressure. The gas pressures may be continuously monitored by the pressure measuring devices 56, 60.

In the PEM 92 the pore size of the electrolyte is sufficiently smaller than the pore size in the first gas distribution and water storage region 88 and second gas distribution and water storage region 96 so that any electrolysis of water from the electrolyte is compensated by a fresh supply of water from the first gas distribution and water storage region 88 and second gas distribution and water storage region 96 to the electrolyte in the PEM 92 through imbibition. It is expected that water will be primarily in the oxygen side. The hydrogen side water storage is used only as a precaution against water migration.

In our system both the fuel (hydrogen) and the oxidant (oxygen) need to be carried downhole. If the reactants are pure hydrogen and oxygen (as opposed to air), all of the terms in the Nernst equation are known. Thus, the open circuit potential is given by the following:

$$V = V_0 + \frac{RT}{2F} \ln\left( \frac{a_{H_2} a_{O_2}^{1/2}}{a_{H_2O}} \right) \quad\quad \text{Equation 3}$$

where the a's are activities, R is the gas constant, T is the temperature, V is the potential, and $V_0$ is the potential at standard state (1 atm, T), and F is the Faraday constant. As mentioned before, upon current withdrawal, the supply voltage would decrease, a nearly reproducible performance curve for each fuel cell. The difference between the actual voltage and the theoretical value as given by Eq. 3 is due to various irreversibilities: activation losses, internal currents, Ohmic losses, and mass-transport limitations. Under ideal gas behavior conditions, the open circuit voltage at a suggested operating pressure of 400 psi or 2.7 MPa at 80° C. as per Eq. 3 is 1.255 V. As discharge occurs, the pressure of oxygen and hydrogen would decrease, and at atmospheric pressure, the potential would drop to 1.18 V (at a temperature of 80° C. at 25° C. this reaches 1.23V). It is recommended that the pressure be kept significantly high so that the water does not boil. While a small decrease in voltage may be utilized to monitor the extent of discharge, direct measurement of pressure is more robust and reliable. An option to monitor impending failure is to look at the discharge performance. Voltage drop below an acceptable value at a fixed current draw signals the need to recharge. This would serve as a redundant monitor before failure of the fuel cell. In our implementation, the preferred mode relies on monitoring the voltage characteristics in conjunction with pressure. These are discussed further below. Once the need to recharge is recognized, the discharge current circuit is disconnected by opening switch 66. The charge current circuit is switched on by closing switch 76, and the power to recharge the fuel cell is obtained via a power conditioner to ensure that the current is injected at a fixed amount (conversely one may fix the voltage and monitor current). It should also be recognized that even if the signal to recharge is not reached, one may choose to begin a recharge so as to keep the system fully charged. For a fixed current injection, the voltage will be monitored. In a preferred embodiment, the fixed current mode is used because of the ability to control the rate of fuel production. When the voltage rises beyond a predetermined threshold, the recharge cycle will be deemed to be complete. This will be independently confirmed when the pressure approaches the original value that we started with, provided no loss of fuel or water occurs from the stack. In our preferred embodiment, we monitor the voltage for a fixed current charge. A voltage in excess of a preset threshold, determined by the product of the number of cells and maximum voltage per cell beyond which the membrane would be damaged, will turn-off the charging process. Additionally, the pressure is monitored, and although unlikely, if it exceeds a preset value based on the expected full charge, the charging process is terminated. Failure to reach the original hydrogen pressure may mean $H_2$ leakage to the ambient, and correspondingly in the oxygen side, it may mean either a leak or an unintended oxidation of materials. In our design, an excess amount of water may be carried initially to compensate for some of the losses. It is for this reason that if one simply monitors the charge voltage alone, pressure in excess of the desired ratings may be reached. We therefore prefer to monitor the voltage rise, and terminate the charging process when either the voltage or the pressure becomes unacceptably large. Similar to the charge cycle, during discharge, we monitor both the pressures and the voltage drops. If the pressure drops below a certain point, either due to leakage or due to the discharging process, a recharge needs to be carried out. If however the voltage drops below the threshold before a significant drop in pressure occurs, the membrane assembly may be flooded without a chance for the water to distribute itself to the storage layers. This may be expected if the discharge is too rapid. To rectify the problem, a lowering of the discharge rate, or a charge, becomes necessary. In practice, We expect to recharge the system before the discharge performance degrades to the point of exhaustion of fuels.

Figure 5:
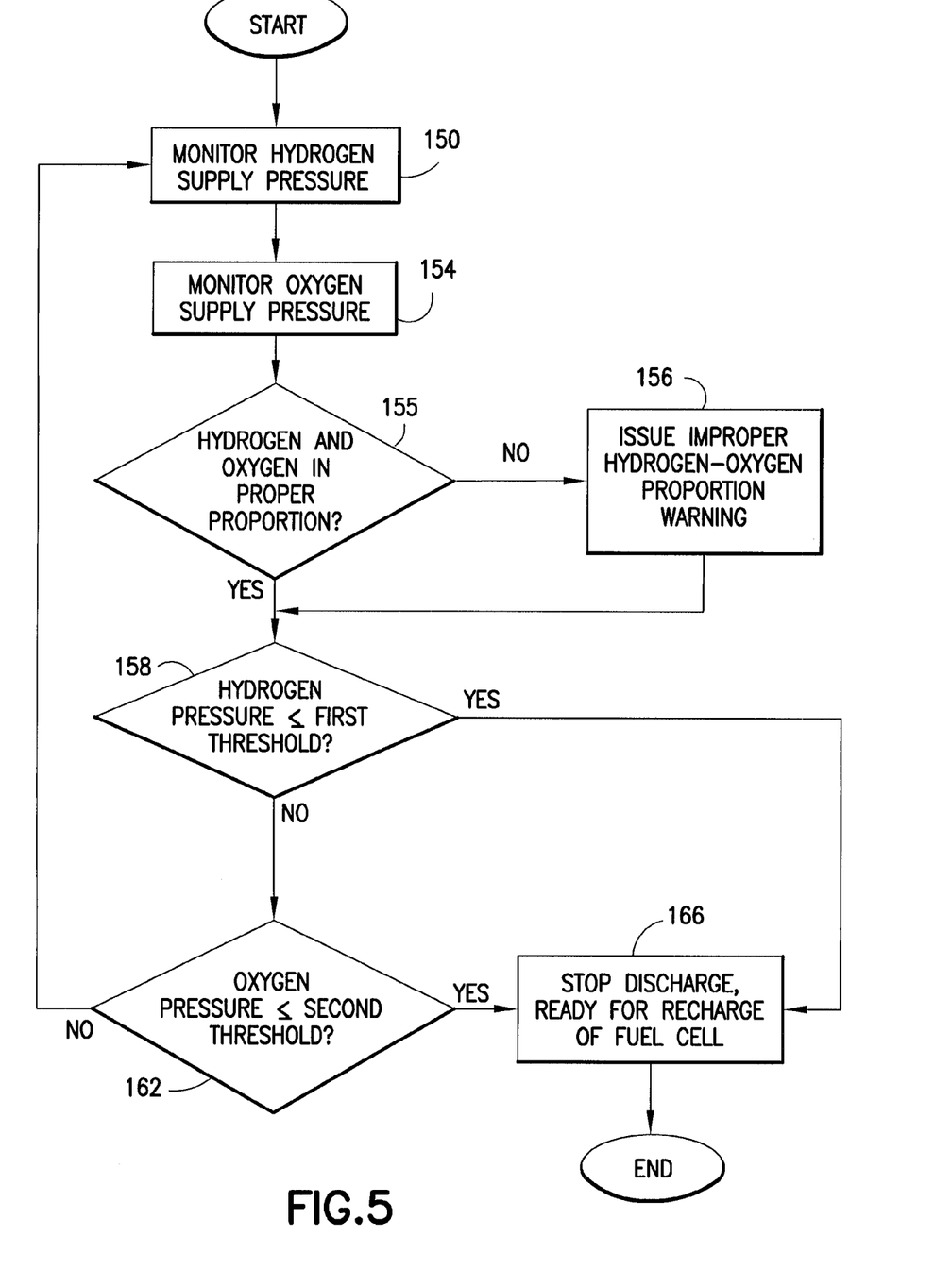
FIG. 5 is a flow chart illustrating a method of determining when to start a recharge procedure for the disclosed fuel cell system.

FIG. 5 shows a flow chart describing one embodiment of a method of determining when to stop a discharge for the fuel cell. At act 150, the hydrogen pressure is monitored by the system controller 68 via the first pressure measuring device 56. At act 154, the oxygen pressure is monitored by the system controller 68 via the second pressure measuring device 60. At query 155, the system controller 68 determines whether the hydrogen pressure change and oxygen pressure change are in proper proportion to each other. If the hydrogen pressure change and oxygen pressure change are not in proper proportion to each other, then the system controller will issue an improper Hydrogen-Oxygen pressure change warning at act 156. In embodiments where both hydrogen and oxygen pressures are monitored, a warning diagnostic may be outputted if the decline in pressures are not in proper proportion to each other. At query 158, the system controller 68 determines whether the hydrogen pressure is at or below a first threshold value. If the hydrogen pressure is equal to or below the first threshold value, then the system controller 68 stops the fuel cell discharge, and fuel cell is put into a ready state to accept a recharge at act 166. At query 162, the system controller 68 determines whether the oxygen pressure is at or below a second threshold value. If the oxygen pressure is equal to or below the second threshold value, then the system controller 68 goes to act 166. In one embodiment, the first threshold value for the hydrogen pressure may be between about 300 psi and about 400 psi. In another embodiment, the second threshold value for the oxygen pressure may be between about 300 psi and about 400 psi. In another embodiment, either hydrogen pressure or oxygen pressure may alone be monitored.

Figure 6:
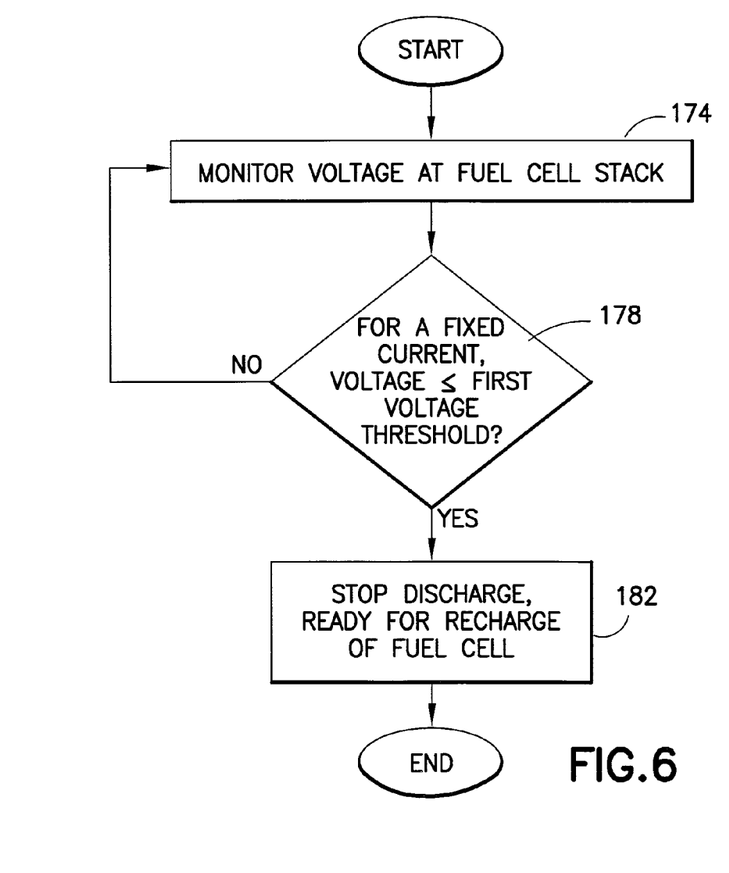
FIG. 6 is a flow chart illustrating another method of determining when to start a recharge procedure for the disclosed fuel cell system.

FIG. 6 shows a flow chart describing an alternative embodiment of a method of determining when to stop a discharge for a fuel cell. This embodiment may be used as a "back-up" of the method described in FIG. 5, or in conjunction with the method of FIG. 5, or alone. At act 174, the system controller 68 monitors the voltage of the fuel cell stack via the voltage measuring device 80. The system controller 68 determines whether the voltage measured is at or below a first voltage threshold at query 178 for a given current. If the voltage is at or below the first voltage threshold, then the system controller stops the discharge, and makes the fuel cell stack ready for a recharge at act 182. In one embodiment the voltage drop threshold may be about 0.5 V/cell. Either the first and second thresholds (Hydrogen and Oxygen pressure thresholds respectively) discussed with respect to FIG. 5 or the first voltage threshold discussed with respect to FIG. 6 may be enough to trigger a stop discharge act 166, 182.

Figure 7:
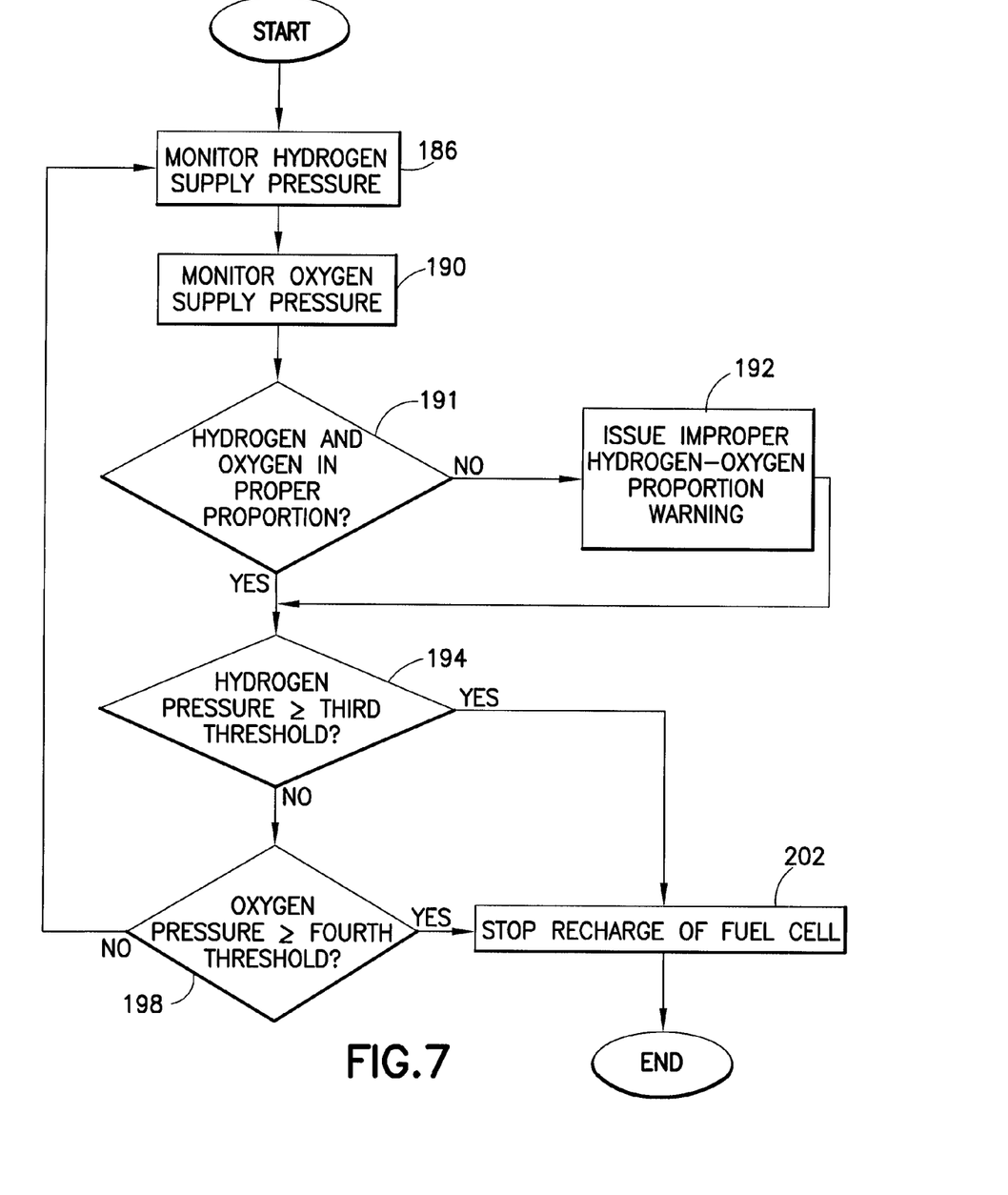
FIG. 7 is a flow chart illustrating a method of determining when to stop a recharge for the disclosed fuel cell system.

FIG. 7 shows a flow chart describing one embodiment of a method of determining when to stop the recharge of a fuel cell. At act 186, the hydrogen pressure is monitored by the system controller 68 via the first pressure measuring device 56. At act 190, the oxygen pressure is monitored by the system controller 68 via the second pressure measuring device 60. At query 191, the system controller 68 determines whether an oxygen pressure increase and a hydrogen pressure increase are in proper proportion to each other. If the pressure increases are not in proper proportion, then a Hydrogen-Oxygen pressure change warning will issue at act 192. At query 194, the system controller 68 determines whether the hydrogen pressure is at or above a third threshold value. If the hydrogen pressure is equal to or above the third threshold value, then the system controller 68 stops the recharge of the fuel cell at act 202. At query 198, the system controller 68 determines whether the oxygen pressure is at or above a fourth threshold value. If the oxygen pressure is equal to or above the fourth threshold value, then the system controller 68 stops the recharge of the fuel cell at act 202. The third and fourth pressure thresholds may be a pressure rise threshold of about 400 psi.

Figure 8:
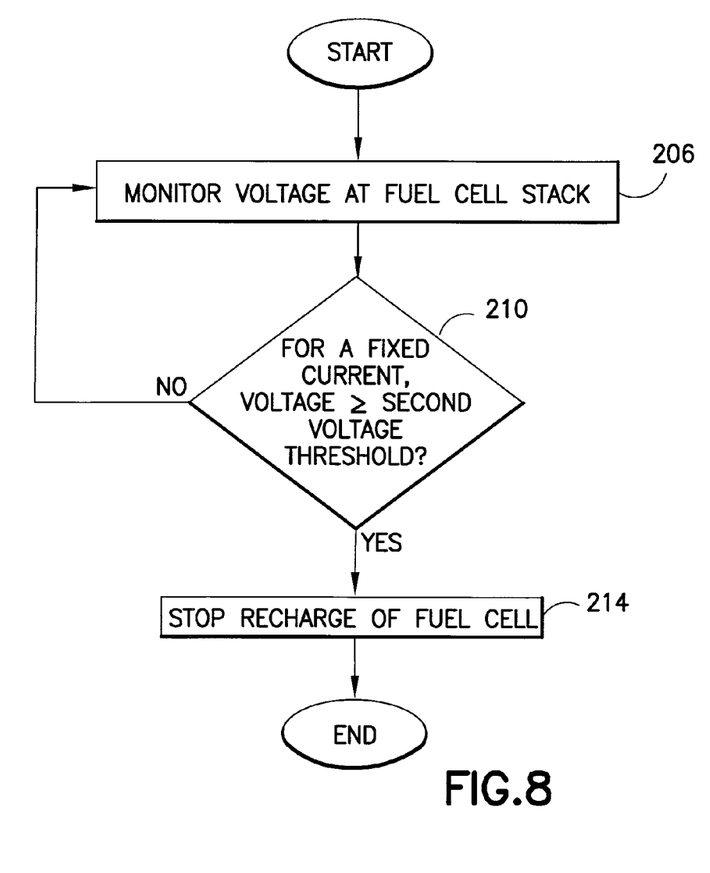
FIG. 8 is a flow chart illustrating another method of determining when to stop a recharge for the disclosed fuel cell system.

FIG. 8 shows a flow chart describing an alternative embodiment of a method of determining when to stop the recharge of a fuel cell. This embodiment may be used as a "back-up" of the method described in FIG. 7, or in conjunction with the method of FIG. 7, or alone. At act 206, the system controller 68 monitors the voltage of the fuel cell stack via the voltage measuring device 80. The system controller 68 determines whether the voltage rise measured is at or above a second voltage rise threshold at query 210 for a fixed current. If the voltage is at or above the second voltage threshold, then the system controller 68 stops the recharge of the fuel cell at act 214. The second voltage threshold may be a voltage rise of about 1.8 V/cell.

Figure 9:
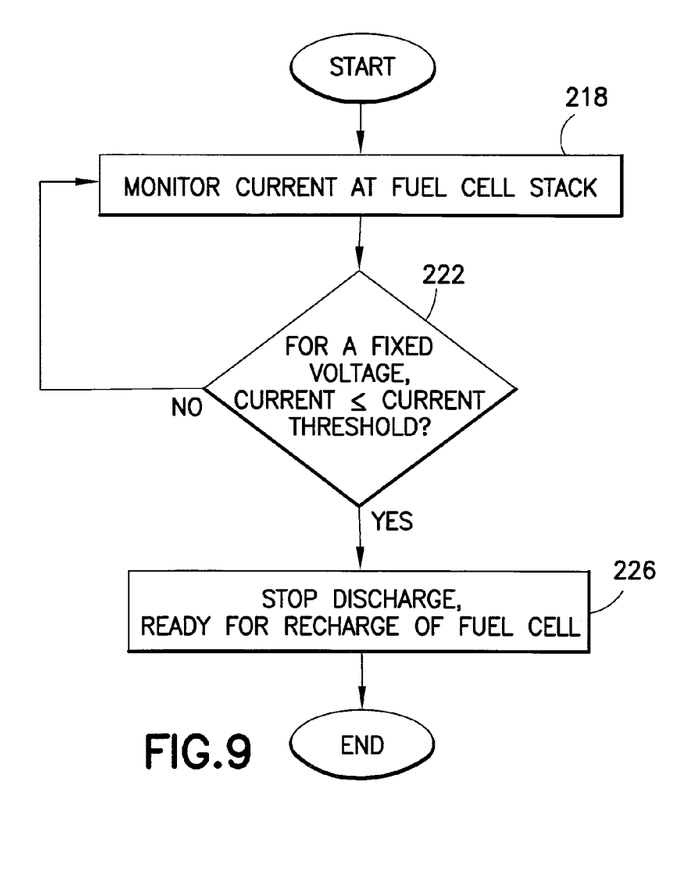
FIG. 9 is a flow chart illustrating a method of using current in determining when to start a recharge procedure for the disclosed fuel cell system.

FIG. 9 shows a flow chart describing an alternative embodiment of a method of determining when to stop a discharge of a fuel cell. This embodiment may be used as a "back-up" of the method described in FIG. 7 and/or FIG. 86, or in conjunction with the method of FIG. 7 and/or FIG. 8, or alone. At act 218, the system controller 68 monitors the current of the fuel cell stack via the current measuring device 80. The system controller 68 determines whether the current measured is at or below a current threshold at query 222 for a fixed voltage. If the current is at or below the current threshold, then the system controller stops the discharge of the fuel cell, and makes the fuel cell ready for recharging at act 226.

Figure 10:
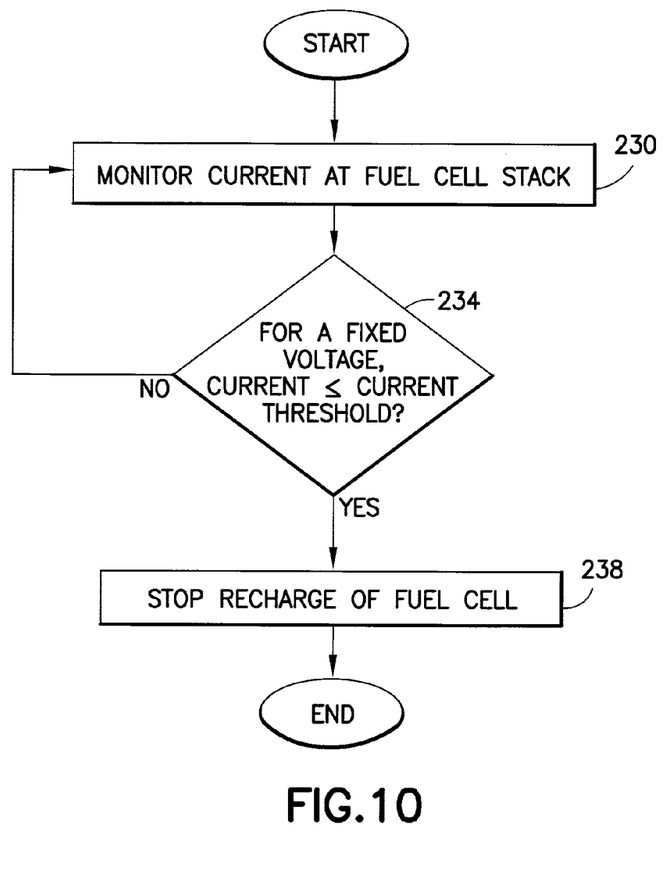
FIG. 10 is a flow chart illustrating a method of using current in determining when to stop a recharge procedure for the disclosed fuel cell system.

FIG. 10 shows a flow chart describing an alternative embodiment of a method of determining when to stop a recharge procedure for a fuel cell. This embodiment may be used as a "back-up" of the method described in FIG. 5 and/or FIG. 6, or in conjunction with the method of FIG. 5 and/or FIG. 6, or alone. At act 230, the system controller 68 monitors the current of the fuel cell stack via the current measuring device 80. The system controller 68 determines whether the current measured is at or below a current threshold at query 234 for a fixed voltage. If the current is at or below the current threshold, then the system controller stops the recharge of the fuel cell stack at act 238. For example, at a fixed voltage of about 1.6 V/cell, the current threshold may be about 0.003 A/cm$^2$. If the current is at or below about 0.003 A/cm$^2$, then the system controller stops the recharge step.

Figure 11:
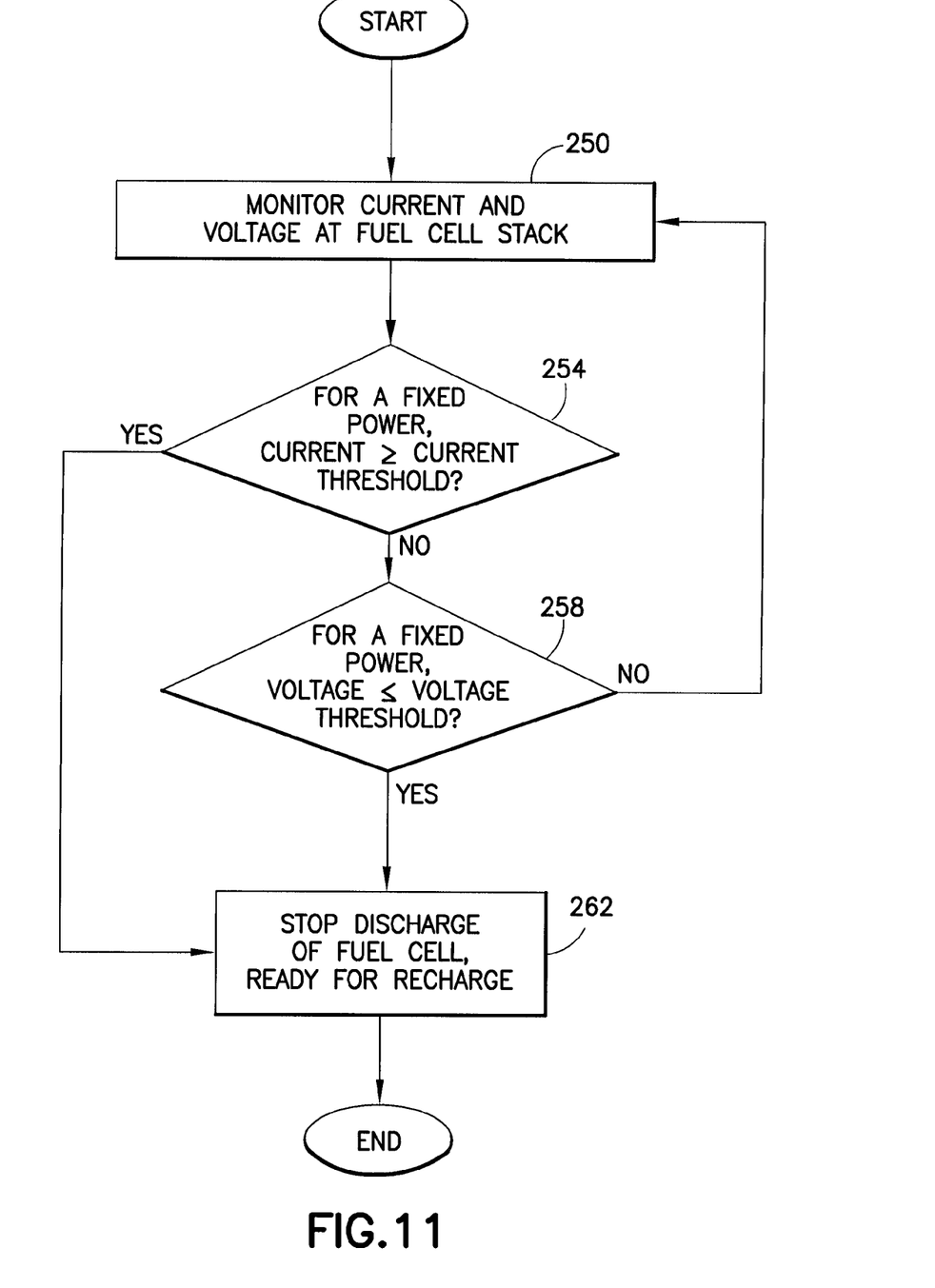
FIG. 11 is a flow chart illustrating another embodiment of a method for determining when to stop a discharge for the disclosed fuel cell system.

FIG. 11 shows a flow chart describing an alternative embodiment of a method of determining when to stop a discharge of a fuel cell. At act 250, the system controller 68 monitors the current and voltage of the fuel cell stack via the voltage and/or current measuring device 80. At query 254, the system controller 68 determines whether the current measured is at or above a current threshold for a fixed power output. If the current is at or above the current threshold, then the system controller stops the discharge of the fuel cell, and makes the fuel cell ready for recharging at act 262. At query 258, the system controller 68 determines whether the voltage measured is at or below a voltage threshold for a fixed power output. If the voltage is at or below above the voltage threshold, then the system controller stops the discharge of the fuel cell, and makes the fuel cell ready for recharging at act 262.

Figure 12:
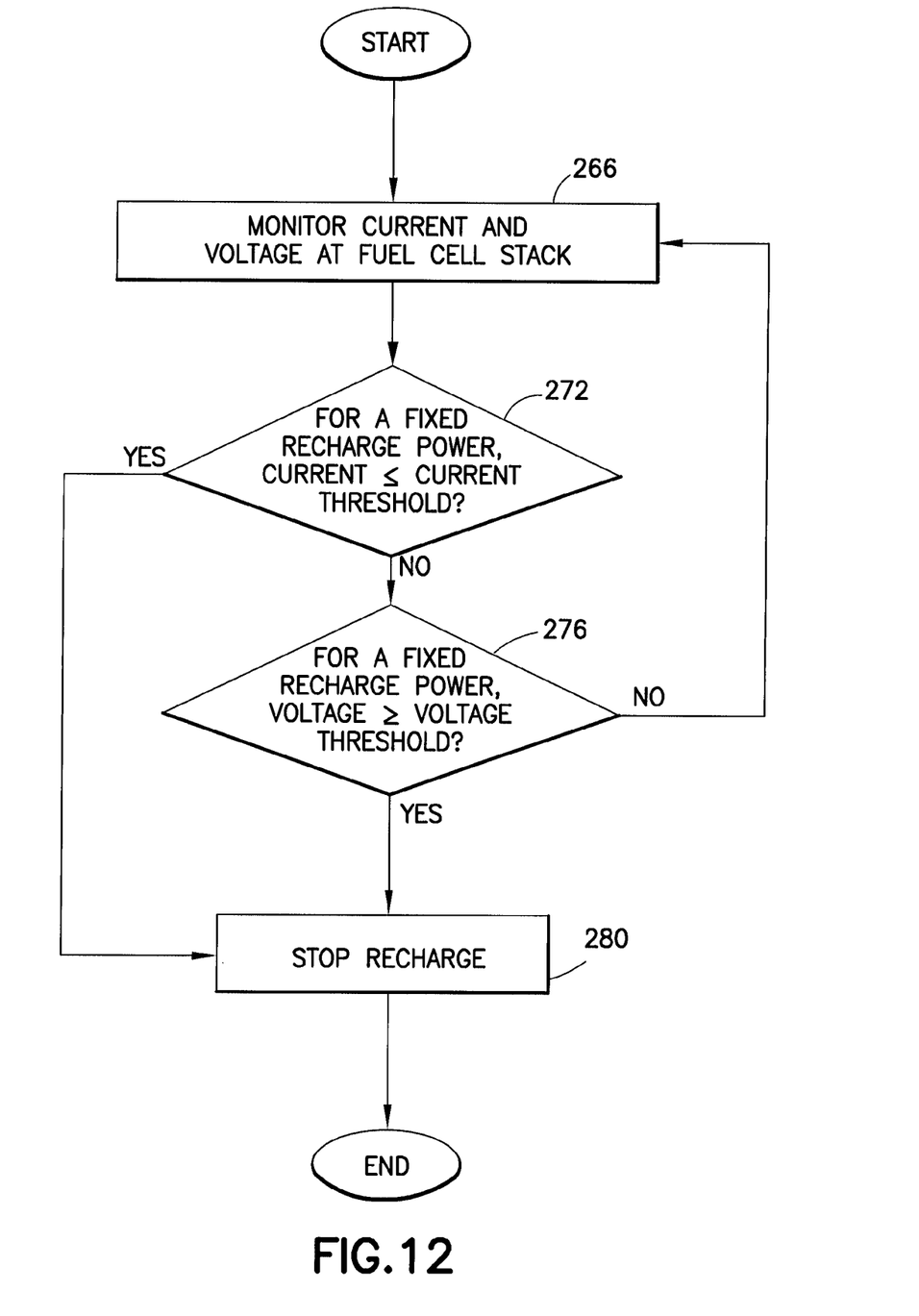
FIG. 12 is a flow chart illustrating another embodiment of a method for determining when to stop a recharge for the disclosed fuel cell system.

FIG. 12 shows a flow chart describing an alternative embodiment of a method of determining when to stop a recharge of a fuel cell. At act 266, the system controller 68 monitors the current and voltage of the fuel cell stack via the voltage and/or current measuring device 80. At query 272, the system controller 68 determines whether the current measured is at or below a current threshold for a fixed recharge power. If the current is at or below the current threshold, then the system controller stops the recharge of the fuel cell at act 280. At query 276, the system controller 68 determines whether the voltage measured is at or above a voltage threshold for a fixed recharge power. If the voltage is at or above the voltage threshold, then the system controller stops the recharge of the fuel cell act 280.

The disclosed fuel cell system 10 has many advantages. The disclosed fuel cell system is environmentally friendly and transportation friendly. The system 10 is reusable and rechargeable. The fuel cell system has a low running cost and a high power density. The disclosed fuel cell system 10 may replace expensive single-use high temperature lithium thionyl chloride batteries that face very restrictive disposal and transportation requirements.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A drill string for excavating a wellbore, the drill string comprising:
   a turbine configured to rotate due to impingement of drilling mud on one or more turbine blades;
   a generator in operable communication with the turbine, wherein the generator is configured to generate electricity using rotation of the one or more turbine blades; and
   a fuel cell system configured to operate in a discharge stage and a charge stage, wherein the fuel cell comprises:
      an oxygen supply;
      a hydrogen supply;
      a fuel cell stack that comprises:
         a first electrode;
         a second electrode;
         a proton exchange membrane located between the first electrode and the second electrode; and
         at least one water storage medium located between the proton exchange membrane and the second electrode;
      wherein, during the discharge stage, the fuel cell system is configured to (i) generate electricity within the fuel cell stack by producing an electrochemical reaction between hydrogen and oxygen provided from the oxygen supply and hydrogen supply and (ii) retain water produced by the electrochemical reaction within the fuel cell stack by storing the water in the at least one water storage medium;
      wherein, during the charge stage, the fuel cell system is configured to generate hydrogen and oxygen within the fuel cell stack by using the electricity generated by the generator to electrolyze the water stored in the at least one water storage medium.

2. The drill string of claim 1, wherein the fuel cell system is in electrical communication with at least one of a voltage measuring device and a current measuring device.

3. The drill string of claim 1, wherein the fuel cell system is in electrical communication with a downhole logging while drilling tool and provides electricity to the downhole logging while drilling tool.

4. The drill string of claim 1, wherein the fuel cell system comprises:
   a power conditioner in electrical communication with the fuel cell stack, wherein the generator is in electrical communication with the fuel power conditioner; and
   a system controller in electrical communication with the power conditioner, the generator, and the fuel cell stack.

5. The drill string of claim 4, wherein:

the first electrode comprises a first bipolar plate;

a first gas distribution and water storage medium is located adjacent to the first bipolar plate;

a first carbon matrix and catalyst region is located adjacent to the first gas distribution and water storage medium;

the proton exchange membrane is located adjacent to the first carbon matrix and catalyst region;

a second carbon matrix and catalyst region is located adjacent to the proton exchange membrane;

a second gas distribution and water storage medium is located adjacent to the second carbon matrix and catalyst region; and the second electrode comprises a second bipolar plate located adjacent to the second gas distribution and water storage medium.

6. The drill string of claim 5, wherein the first gas distribution and water storage medium and the second gas distribution and water storage medium are configured to store water produced by a fuel cell reaction.

7. The drill string of claim 5 wherein the first gas distribution and water storage medium and the second gas distribution and water storage medium both comprise a woven porous carbon cloth.

8. The drill string of claim 5 wherein the first gas distribution and water storage medium and the second gas distribution and water storage medium both comprise a hydrophilic carbon paper.

9. The drill string of claim 1, wherein, during the discharge stage, the first electrode is configured to act as an anode and the second electrode is configured to act as a cathode; and wherein, during the charge stage, the first electrode is configured to act as a cathode and the second electrode is configured to act as an anode.

10. The drill string of claim 1, wherein the fuel cell system is configured to use the hydrogen and oxygen generated during the charge stage to generate electricity in a subsequent discharge stage.

* * * * *